Patented Feb. 10, 1931

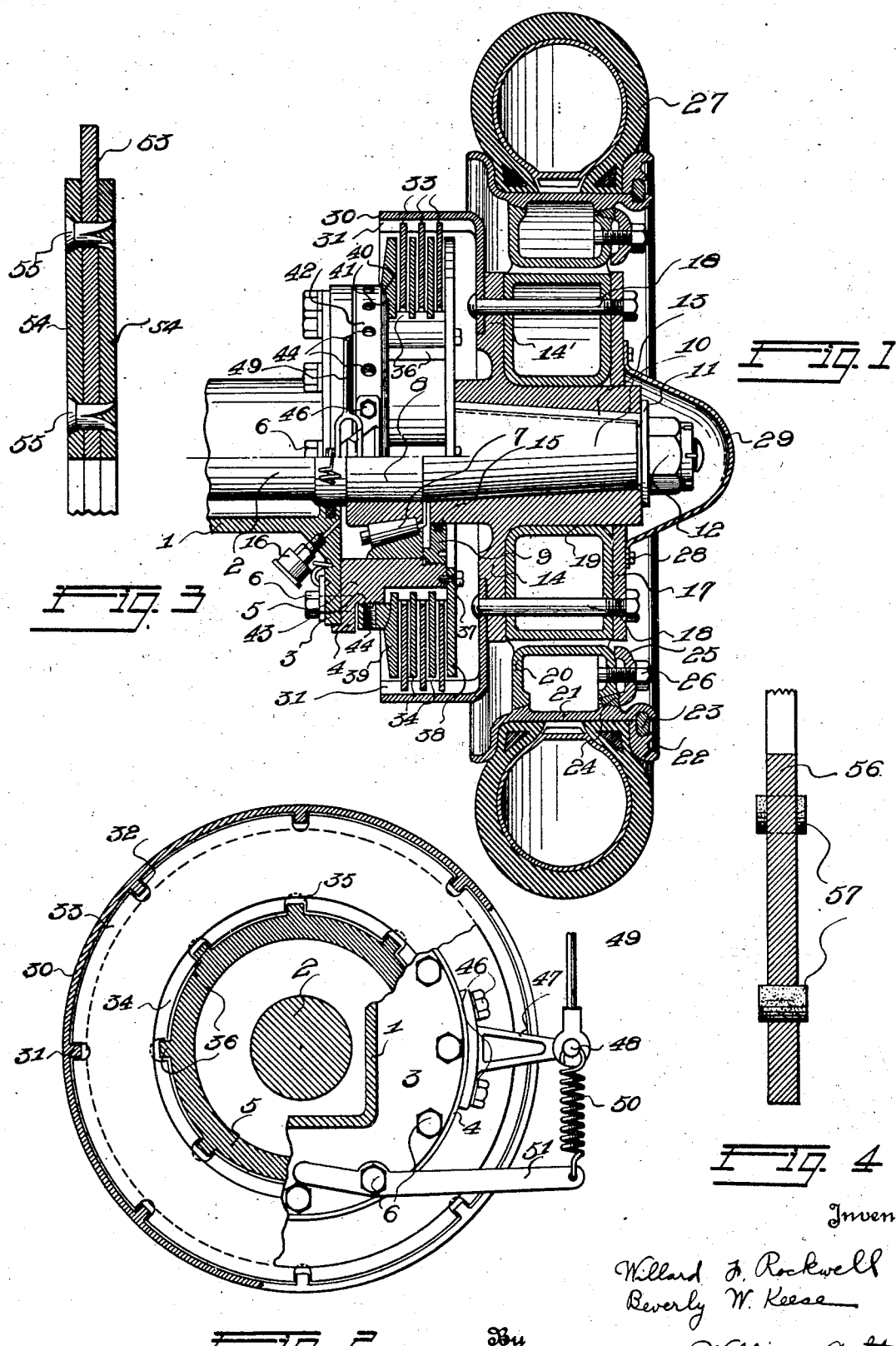

1,791,685

UNITED STATES PATENT OFFICE

WILLARD F. ROCKWELL AND BEVERLY W. KEESE, OF OSHKOSH, WISCONSIN, ASSIGNORS, BY MESNE ASSIGNMENTS, TO THE TIMKEN-DETROIT AXLE COMPANY, OF DETROIT, MICHIGAN, A CORPORATION OF OHIO

VEHICLE BRAKE AND WHEEL CONSTRUCTION

Application filed October 28, 1926. Serial No. 144,787.

The present invention relates to vehicle brake and wheel constructions. More particularly the invention relates to an improved wheel and brake construction for driven wheels especially adapted for use in automobiles.

Owing to the use of oversize low pressure automobile balloon tires, wheels of smaller diameter have been adopted in which the available room for brakes is restricted. Accordingly, a primary object of the present invention is to provide a compact brake arrangement especially adapted for use with vehicles having small wheels in which the available space for brakes is limited.

A tendency exists in automotive transportation to increase the load carrying capacity and speed of operation so that heavy brake loads must be handled. The prior proposed arrangements for braking vehicles operating at high speed and under heavy loads have been more or less unsatisfactory, short in life, and dangerous due to the tendency of the linings to burn out. A further object of the present invention is to provide a novel and efficient braking construction that will efficiently brake heavy loads operating at high speeds and over relatively long periods of time, without excessive wear thereby increasing the safety of heavy duty and high speed automotive transportation.

Another object of the invention is to provide novel compensating and adjusting brake mechanisms in which the wheels, together with the brake drums, may readily be removed from and replaced on the axle, without disturbing the arrangement of the brake parts.

Our invention in its preferred form comprises novel multiple disk brake construction for application to differentially driven wheels of a motor vehicle. We are aware that it has been heretofore proposed to provide multiple braking arrangements for motorcycles and automobiles, but the prior proposed arrangements have been of impractical nature for efficient braking of automobiles. Among the defects of the prior arrangements are the failure to provide means for securing the substantially uniform application of pressure to the braking surfaces, the arrangement of parts so that the wheels are not readily removable from the axles, and the transmission of compressing reactions. Accordingly, a further object of the invention is to provide efficient multiple disk brakes for use in automobiles in which the compression on the brake disks are uniformly applied, in which the compressing reactions are resisted independently of the wheels so that no end thrust is applied to the wheel structure, and in which the wheels are easily removable from the axles without disturbing the braking disks and operating mechanisms.

Further objects of the invention are such as will appear in the following detailed description of the preferred embodiments thereof, and are such as may be attained by utilization of the various principles, combinations, and sub-combinations hereinafter set forth, and defined by the terms of the appended claims.

As shown in the drawings—

Figure 1 is a plan view, partially in section and with parts broken away, showing a preferred embodiment of our invention.

Figure 2 is a side elevation, partially in section with parts removed, of the form of invention shown in Figure 1.

Figure 3 is a detailed fragmental sectional view showing a modified form of friction disk with frictional facings adapted for use with the invention.

Figure 4 is a further modification of friction disks for use with the invention.

In its preferred form, our invention is applied for use as an automobile brake. The numeral 1 indicates the end of a load carrying housing of a differential driven axle in which the differentially driven axle shaft 2 is supported in well known manner. The details of the axle housing and differential mechanism not shown, may be of any conventional type. The axle housing 1 is provided with a flange 3 to which the flange 4 of the brake anchor 5 is secured by means of the securing studs 6. Supported in an internal bore of the brake anchor member 5 is the hub roller bearing 7 for bearing section 8 of the axle shaft 2. Threaded in the end of the bore formed in the brake anchor 5 is an adjusting nut 9 for hub bearing 7. Secured to tapered end section 10 of the axle shaft 2 by means of the washer 11, nut 12, and hub key 13 is the wheel hub 14, the inner end of which extends into and is rotatable in a central recess in the hub adjusting nut 9. Suitable packing members 15 are provided in the end of the housing 1 and the hub bearing adjusting nut 9 to retain lubricant in the bearing 7. A suitable grease cup 16 may be provided for injecting grease into the hub bearing.

Secured on the wheel hub 14, between wheel flange 17 and the hub flange 14' by means of the securing bolts 18 is the wheel body 19 to which is secured by suitable radial spokes or ribs, the wheel felly 20. Formed on the wheel felly 20 is a demountable and quick detachable rim structure comprising the rim 21, detachable flange 22, and securing ring 23. Rim 21 is held in position on the wheel felly 20 by suitable wedging means 24, a set of spaced securing lugs 25, and securing studs 26. Supported on the rim structure is the pneumatic low pressure or balloon tire 27. Secured to the wheel flange 17 by means of the cap screws 28 is the hub cap 29, and secured to the inner flange of hub 14 by means of the bolts 18 is the brake drum 30 which has formed integrally with the interior surface thereof, driving tongues or splines 31 fitting slidably into the recesses or keyways 32 of the driven friction disks 33 supported within the drum.

Disks 33 are provided with the central bores which fit over the brake anchor section 5, and positioned between them are the co-operating disks 34 which are provided with the recesses or grooves 35 that fit slidably over the spline or tongue 36 of the brake anchor section 5. Secured to the outer end of the brake anchor 5 by means of cap screws 37 is the flange 38 and slidably mounted on the anchor 5 is the compression disk 39 which is also provided with grooves 35 fitting over the tongues or splines 36 of the brake anchor 5. Compression disk 39 is provided with a spherical seat 40 which seats against spherical surface 41 of brake compressing collar 42. Collar 42 is provided with an internal thread and is screwed on a threaded section 43 of the brake anchor 5. Formed in the collar 42 are the spaced threaded holes 44 into which the securing cap screws 46 of the brake actuating arm 47 are adapted to fit. The threaded holes 44 are spaced suitably so that the position of the actuating arm 47 may be varied about the periphery of the compression collar 42 to compensate for wear of the brake parts. Secured to the end of actuating arm 47 by means of the pivot pin 48 is the end of an actuating rod 49. A spring 50 is provided, one end of which is secured in a suitable hole formed in the pin 48 and the other end of which is secured to a hole formed in the end of arm 51 which is secured in position by cap screw 6. Spring 50 normally tends to rotate actuating arm 47 in a clockwise direction in Figure 2, causing collar 42 to move to the left in Figure 1, releasing the pressure on the compressing disk 39.

In operation of the device, the axle 2 is driven and rotates the wheel hub 14 together with the wheel and the brake drum 30. Rotation of the brake drum 30 causes rotation of the friction disks 33. So long as the parts remain in the position shown, no pressure will be applied to bring disks 33 and 34 into contact and the wheel will rotate freely. When it is desired to retard or stop the wheel, rod 49 is actuated to rotate arm 47 and the collar 42 in a counter-clockwise direction in Figure 2 against the tension of the spring 50. As collar 42 rotates it advances on threaded section 43, forcing compression disk 39 to the right in Figure 1. This movement of the disk 39, presses rotating disks 33 and stationary disks 34 into contact with each other and with the inner faces of flange 38 and compression member 39 retarding the rotation of disks 33, together with drum 30 and the wheel and driving shaft.

It will be understood that the disks 33 and 34 may be of any suitable material. In one preferred form of the invention the disks 33 may be of brass or bakelite, and disks 34 together with flange 38 and compression disks 39 and the flange 38 may be of steel, to secure the increased frictional coefficient due to the use of the different materials. Instead of the plain metallic disks, a disk 53 provided with facings of friction material 54 secured in position by the counter-sunk rivets 55 or metallic friction disks 56 provided with a plurality of cork or rubber inserts 57, may be substituted for the metallic disks 33 and 34. When friction disks of the type disclosed in Figures 3 and 4 are utilized, noise due to the clashing of the plates as the brakes are actuated is eliminated.

It is to be noted that none of the compressing forces or reactions are applied to the brake drum and the wheel structure. All of these reactions are resisted against flange 38 of the brake anchor. It will also be noted that by removing the hub cap 29 and the nut 12, that the wheel assembly together with the brake drum 30 may be removed endwise leaving the disks 33 in position on the brake anchor without disturbing any of the brake actuating parts or linkages. If desired, the drum 30 may be provided with a suitable detachable end cap to permit the retention of lubricant within the brake structure and to exclude dirt therefrom. In this case before the wheel structure can be removed from the axle, the cap must be detached. Because of the spherical seat of the compression disk 39, against the collar 42, a universal seating movement of the disk 39 will be permitted so that the disk 39 will apply a uniform pressure thereto insuring a maximum frictional surface engagement and uniform pressures at all times so that the wear will be uniformly distributed and a maximum life of parts secured. As the disks wear and become thinner, actuating member 47 may be removed and the collar 42 adjusted to proper position for each operation and the actuating member 47 may then be replaced in proper relation to the collar 42 for operation by rod 49.

Having described preferred embodiments of our invention only, what is desired to be secured by Letters Patent and claimed as new is:

1. A braking arrangement for a wheel comprising a plurality of laterally movable disks, some of which are arranged to rotate with the wheel and others of which are supported independently of said wheel, means to move said disks laterally, said means including an adjustable ring engaging a shiftable ring abutment, the engaging surfaces of said rings being so shaped as to permit limited universal movement between these elements.

2. In combination, a driven wheel, an axle housing, a brake anchor carried by said housing, a brake drum carried by said wheel, laterally movable friction disks of two types disposed around said anchor, one type being fixed against rotation with respect to said anchor and the other type being fixed against rotation with respect to said drum, and means mounted on said anchor to move said disks laterally into frictional engagement, said means including a member movable toward and from said disks and provided with a spherically shaped surface universally seated in a corresponding surface on one of said disks.

3. In a brake mechanism including laterally movable brake elements, means to shift said elements to operative position, comprising a laterally shiftable sleeve that is actuated when it is rotated, said sleeve being provided with a plurality of peripherally spaced fastening means, and mechanism to rotate said sleeve, said mechanism being provided with fastening means designed to cooperate with any of said first named fastening means, whereby adjustment of the mechanism with respect to said sleeve is facilitated.

4. In combination, an axle housing, a brake anchor secured thereto, a ring abutment secured to said anchor, brake disks surrounding said anchor, alternate disks being non-rotatable with respect to said anchor, other disks being rotatable with respect thereto but provided with peripheral means designed to slidably receive means carried by a wheel to slidably spline said disks to the wheel, a movable abutment, an adjusting ring in engagement therewith, said last named abutment and ring being provided with matching spherical surfaces, and means to adjust said ring, said means being designed for connection to said ring at any one of a number of spaced peripheral positions.

5. In combination, an axle housing rigidly carrying at its outer end a concentric radially extending flange, an axle mounted in said housing with its tapered end projecting outwardly beyond said flange, a driven wheel mounted upon said tapered portion, a drum secured to the inner side of said wheel with its peripheral surface radially spaced from that portion of the axle between the wheel and said flange, and a brake mechanism detachably secured to the outer annular surface of said flange and disposed within said drum in such manner as to permit removal of the wheel and drum as a unit.

6. In the construction defined in claim 5, said brake mechanism comprising an anchoring sleeve secured to the outer side of said flange, a plurality of laterally movable disks surrounding said sleeve, some arranged to rotate with the drum and others fixed against rotation by said sleeve, and means for laterally shifting said disks into cooperating frictional engagement.

7. In the apparatus defined in claim 5, said brake mechanism including an anchoring sleeve concentric with said shaft and provided with a locating flange for engaging the outer periphery of said first mentioned flange.

In testimony that we claim the foregoing we have hereunto set our hands at Oshkosh, in the county of Winnebago, and State of Wisconsin.

W. F. ROCKWELL.
BEVERLY W. KEESE.